United States Patent [19]

Ferrar et al.

[11] Patent Number: 5,137,357
[45] Date of Patent: Aug. 11, 1992

[54] INTERFEROMETRIC SIGNAL ANALYSIS WITH MODULATION SWITCHING

[75] Inventors: Carl M. Ferrar, East Hartford, Conn.; Timothy J. Bailey, Longmeadow; Daniel P. Courtney, Wilbraham, both of Mass.

[73] Assignee: Honeywell Inc., Minneapolis, Minn.

[21] Appl. No.: 544,552

[22] Filed: Jun. 27, 1990

[51] Int. Cl.$^5$ ............................................. G01B 9/02
[52] U.S. Cl. ..................................... 356/350; 372/94
[58] Field of Search ........................... 358/350; 372/92

[56] References Cited

U.S. PATENT DOCUMENTS

| | | | |
|---|---|---|---|
| 4,545,682 | 10/1985 | Greenwood | 356/350 |
| 4,645,345 | 2/1987 | Domann | 356/350 |
| 4,863,272 | 9/1989 | Coccoli | 356/350 |
| 4,981,358 | 1/1991 | McBrien et al. | 356/350 |
| 4,998,822 | 3/1991 | Steele | 356/350 |

FOREIGN PATENT DOCUMENTS 0294915 12/1988 European Pat. Off. .
3123163 1/1983 Fed. Rep. of Germany .

OTHER PUBLICATIONS

"Integrated Optics: A Practical Solution for the Fiber Optic Gyro," SPIE vol. 719, pp. 101–112 (1986).

Primary Examiner—Stephen C. Buczinski
Attorney, Agent, or Firm—John G. Shudy, Jr.

[57] ABSTRACT

In a fiber optic rotation sensor, two phase modulators are symmetrically offset with respect to the center of an optical fiber loop and alternately excited by a waveform whose frequency alters the differential phase between counter-propagating light waves in the loop to maintain a fixed intensity signal at a detector upon loop rotation. The difference between the waveform frequencies is proportional to the speed of sensor rotation while the mean value of the waveform frequencies equals the frequency value in the absence of sensor rotation. In the alternative, a single modulator is excited by a waveform whose polarity is reversed at intervals of time.

16 Claims, 2 Drawing Sheets

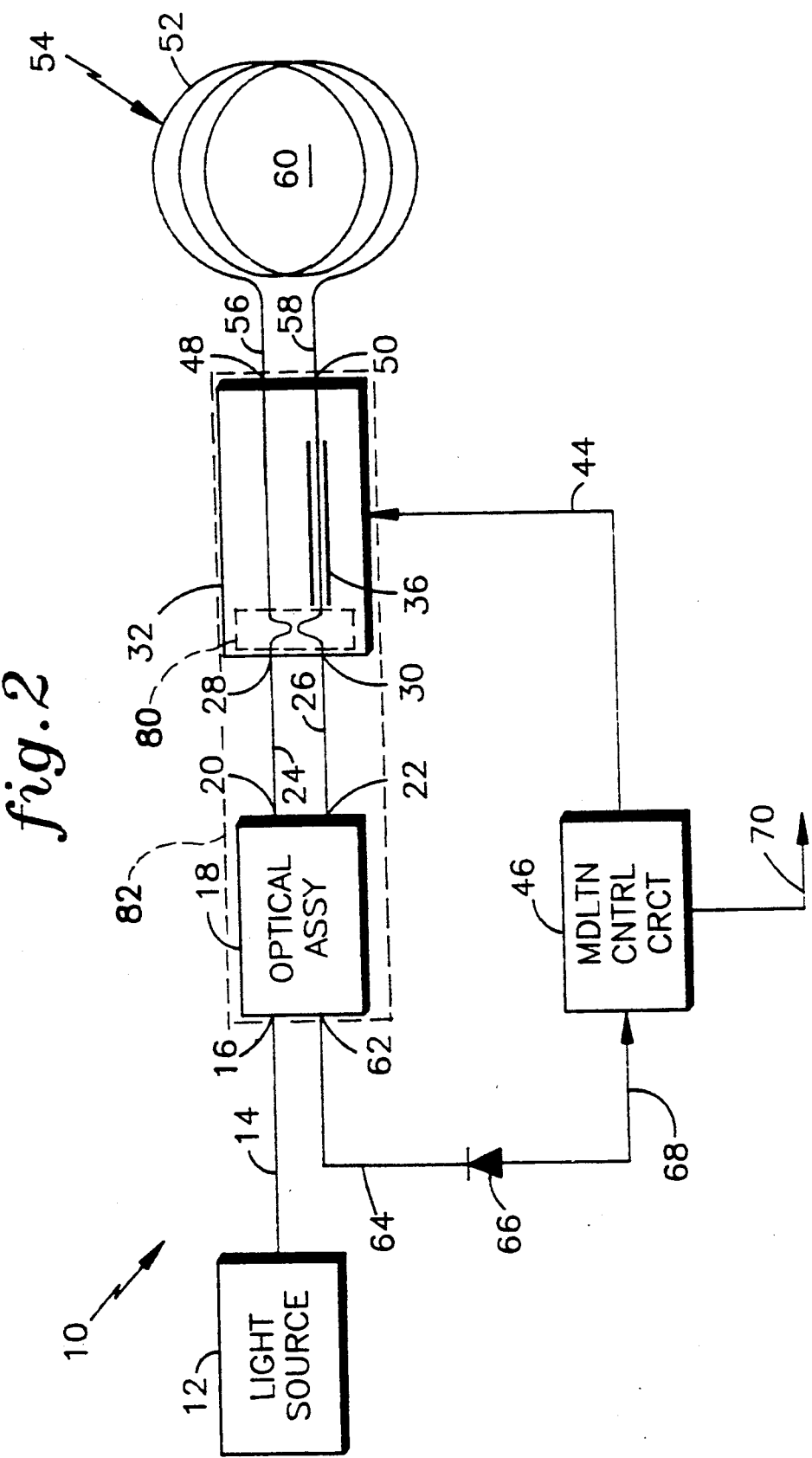

INTERFEROMETRIC SIGNAL ANALYSIS WITH MODULATION SWITCHING

TECHNICAL FIELD

This invention relates to optical interferometers, and more particularly to a Sagnac interferometer having modulation switching in a feedback loop thereof to improve rotation rate measurement accuracy.

BACKGROUND ART

Interferometric signal analysis involves the determination of signal wavelength, wave velocities, distances and directions using interference phenomena between, e.g., two coherent optical signals. Particular application may include optical signal analysis in a fiber optic gyroscope (FOG).

A FOG typically includes a light source, e.g., a laser diode, which provides coherent light split into two substantially equal waves by a beamsplitter. The beamsplitter is coupled to the ends of a length of optical fiber wound in a coil. The light waves are launched into each end of the coil, and are recombined interferometrically at the coil output such that the light intensity seen by a detector depends on the relative phases of these waves.

When the coil is subject to rotation about an axis normal to the coil, the counter-propagating waves take different times to traverse the coil. This non-reciprocal phenomenon, known as the Sagnac effect, causes a change (shift) in the relative phase between the waves reaching the detector and, therefore, a change in the light intensity signal at the detector. Depending on the initial phase difference, which can be controlled, for example, by application of suitable phase modulation at one end of the coil, the magnitude and sense of the change in the light intensity signal depend, respectively, on the rate and direction of the rotation applied to the coil about the axis.

The rotation-induced change can be compensated for, i.e., nulled, by imposing between the waves a further phase difference, equal and opposite to the Sagnac phase difference. Various methods are known in the art of imposing such a phase difference. For example, a lithium niobate integrated optical phase modulator at one end of the coil can be driven by an appropriate waveform, such as an analog or stepped digital periodic ramp, i.e., a serrodyne waveform. Control of an appropriate waveform parameter, e.g., frequency, in response to rotation alters the modulator-induced phase difference such that it nulls the rotation-induced difference. The value of the parameter that produces the desired null serves as a measure of the rotation rate. For example, in an appropriately initialized FOG employing a fixed-amplitude serrodyne modulation waveform, the serrodyne (ramp) frequency change needed to null the Sagnac phase is proportional to the rotation rate; and the sign, i.e., the direction, of this change indicates the rotation direction.

More specifically, when a serrodyne FOG is not subject to rotation, there are various ramp frequency values, including zero, for which the gyro output is nulled. Frequently, FOG initialization selects "zero" as the operating "setpoint". This value has the advantage that it is independent of physical parameters of the FOG. However, the ramp polarity must then reverse whenever the rotation direction reverses, to avoid the need for "negative" frequencies. If the ramp reversal is imperfect, large scale-factor errors may adversely affect low-rate measurements. An alternative to this approach is to select one of the non-zero output-nulling frequencies $f_0$ as the setpoint. If the FOG is then subject to rotation about an axis normal to the coil, and the ramp frequency is controlled to null the Sagnac phase shift, the difference between the new frequency and the setpoint $f_0$ serves as a measure of the rotation rate and represents the output of this closed-loop FOG. If the selected value $f_0$ is sufficiently large, the ramp frequency remains positive even at the largest rotation rates, and rate-dependent ramp polarity reversals are avoided.

However, the non-zero setpoint values typically depend on physical parameters of the FOG, which may be subject to drift, thereby degrading the accuracy in measuring FOG rotation rate. Setpoint drift may be caused by changes in the environment in which the FOG must operate, e.g., changes in temperature, and usually can not be precisely predicted. Unpredictable errors produced by such drift in a FOG operated as described above make it unsuitable for use in systems requiring highly accurate rotation sensing.

Similar arguments are applicable to other closed-loop interferometric sensors in which the phase shift response to a measurand can be nulled by controlling one or more phase modulation parameters in proportion to the sense and magnitude of the measurand.

DISCLOSURE OF INVENTION

Objects of the present invention include provision of an interferometric optical sensor employing improved closed-loop signal analysis which increases sensor sensitivity to measurands such as sensor rotation, reduces sensitivity to variations of certain sensor parameters which cause setpoint drift, and provides, while measurements are being made, an accurate indication of what the sensor output would be in the absence of a measurand, such indication being helpful in evaluating certain parameters of the sensor itself.

According to a first aspect of the present invention, two matched phase modulators are symmetrically offset with respect to the center of a sensing loop of optical waveguide in a Sagnac interferometer sensor, the modulators are alternately excited by a waveform, specific parameters (e.g., frequency) of which are controlled by a detector feedback signal to alter the differential phase between counter-propagating waves which pass through the modulators and the loop, to maintain thereby a fixed intensity signal at the detector when the sensor is subjected to a non-reciprocal perturbation, such as an arbitrary rotation rate, the difference between the waveform parameters applied to the two modulators being, preferably, proportional to the applied perturbation, the mean value of the controlled waveform parameters applied to the two modulators equalling approximately the parameter value which would be assumed in the absence of the perturbation.

According to a second aspect of the present invention, a phase modulator is offset from the center of a sensing loop of optical waveguide in a Sagnac interferometer sensor, the modulator is alternately excited by a signal with specific waveform parameters (e.g., frequency), then by a signal of reverse polarity with changed values of these parameters, the values being controlled by a detector feedback signal to control the differential phase between counter-propagating waves which pass through the modulator and the loop, to maintain thereby a fixed intensity signal at the detector when the sensor is subjected to a non-reciprocal perturbation, such as an arbitrary rotation rate, the difference between the controlled waveform parameters applied alternately to the modulator being, preferably, proportional to applied perturbation, the mean value of these waveform parameters equalling approximately the parameter value which would be assumed in the absence of the perturbation.

The present invention represents a significant advancement over previous methods of determining sensor rotation. Modulator induced phase differences produced between counter-propagating light waves in a loop of optical waveguide are an odd-symmetric function of both modulator offset with respect to loop center and polarity of the modulation. Thus, in a closed loop Sagnac interferometer which maintains a fixed optical output intensity signal, the difference between the waveform parameters applied alternately to two modulators symmetrically offset with respect to the sensing loop in accordance with a first aspect of the invention, and similarly the difference between the waveform parameters applied to a single modulator alternately operated at reverse polarities in accordance with a second aspect of the invention, provides a sensor output which is doubly sensitive to non-reciprocal perturbations such as sensor rotation rate and is insensitive to setpoint drift resulting from variations of certain sensor parameters.

Other objects, features and advantages of the present invention will become more apparent in the light of the following detailed description of an exemplary embodiment thereof, as illustrated in the accompanying drawing.

BRIEF DESCRIPTION OF THE DRAWING

FIG. 2 is a schematic drawing of an interferometric optical sensor having modulation switching of one modulator in the serrodyne feedback loop of the sensor in accordance with a second aspect of the invention.

BEST MODE FOR CARRYING OUT THE INVENTION

Figure 1:
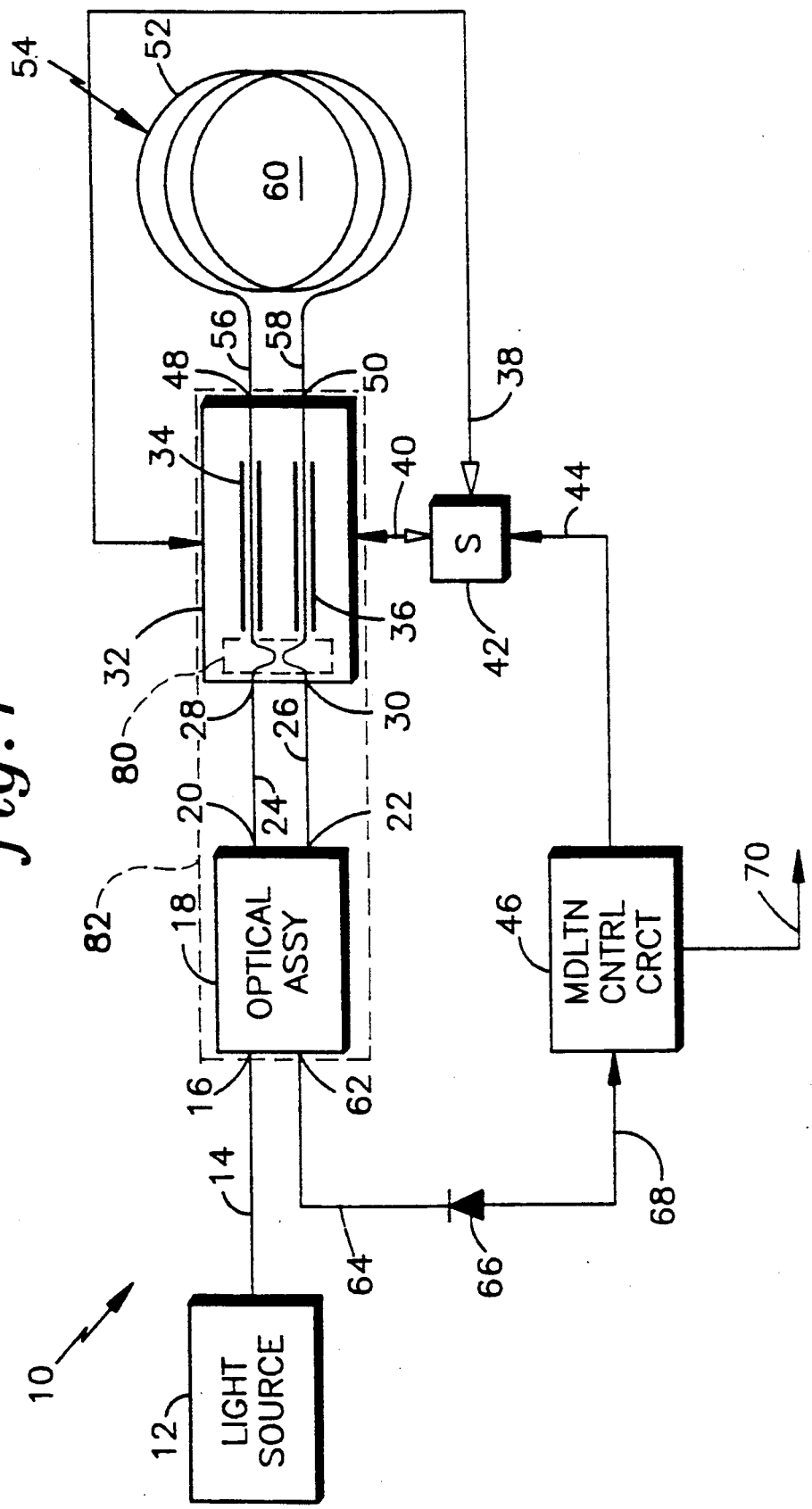
FIG. 1 is a schematic drawing of an interferometric optical sensor having modulation switching between two modulators in a serrodyne feedback loop of the sensor in accordance with a first aspect of the invention.

Referring to FIG. 1, a closed loop interferometric optical sensor; more specifically, a fiber optic gyroscope (FOG) 10, includes a light source 12, e.g., a laser diode or superluminescent diode. Light from the source 12 is coupled by known means, e.g., through a first optical fiber 14, to a first port 16 of an optical assembly 18.

Assembly 18 comprises known optical components such as beamsplitters (e.g., four-port fused-fiber star couplers or integrated optical Y-couplers), polarizers, and single-mode elements (e.g., single-mode fibers or waveguides). The components are arranged such that light which has entered port 16 is split by known means, e.g., a Y-shaped integrated optical (IO) waveguide, preferably after having passed through a single-mode single-polarization filter component, which may be, e.g., a known metallized optical waveguide segment, into two waves which may be of approximately equal intensities and which exit from the assembly through second and third ports 20,22.

Ports 20,22 are optically coupled by known means, e.g., through second and third optical fibers 24,26, to first and second ports 28,30, respectively, of a modulator assembly 32, which may alternatively be an integral part of optical assembly 18. Modulator assembly 32 may be fabricated on an integrated optical device. Or, beamsplitter 80 and modulator assembly 32 may be fabricated on an integrated optical device. Assembly 18 and modulator assembly 32 of FIGS. 1 and 2 may represent integrated optical devices. Waves entering ports 28,30 are directed, e.g., through optical fibers or waveguides, to a pair of optical phase modulators 34,36, respectively. Each modulator 34,36 may comprise, e.g., an optical waveguide sandwiched between a pair of parallel electrodes according to known techniques. The modulators are selectively driven by a modulation signal on lines 38,40 via a switch 42, the signal being provided on a line 44 from a modulation control circuit 46. After passing through the modulators the waves exit the modulator assembly 32 through third and fourth ports 48,50. Integrated optics device 82 incorporates assemblies 18 and 32.

A fourth optical fiber 52, is wound into a Sagnac sensing loop 54. The fiber 52 typically comprises a single-mode fiber, but may be a multi-mode fiber if desired. The ends 56,58 of the fiber are coupled by known optical means to the modulator assembly ports 48,50. The two waves exiting the modulator assembly via ports 48,50 counter-propagate in the loop 54. The loop may comprise a plurality of turns of optical fiber which may be wound on a cylindrical spool 60.

After traversing the loop, the waves re-enter the modulator assembly via ports 48,50, pass again through the modulators 34,36, and re-enter optical assembly 18 via ports 20,22. In the optical assembly the waves are recombined by known means, e.g., the aforementioned Y-shaped IO waveguide. A portion of the recombined light is split off by known means, e.g., a fused-fiber coupler, preferably after again passing through the aforementioned single-mode single-polarization filter component to ensure, as is known, reciprocal optical paths for the counter-propagating waves in the FOG in the absence of rotation. The split-off portion of light exits the optical assembly via a fourth port 62 and is directed by known optical means, e.g., an optical fiber 64, to a photodetector 66, e.g., a photodiode. The remainder of the recombined light typically exits the optical assembly via first port 16, and may pass through or be absorbed in the source 12.

The photodetector 66 provides on a line 68, to the modulation control circuit 46, an electrical signal proportional to the intensity of the optical signal at the fourth port 62 of the optical assembly, this optical signal representing the optical output signal of the FOG.

During FOG operation, the modulation control circuit alternately drives the modulators through switch 42 with a modulation signal on the lines 38,40. The output of the modulation control circuit is also provided on a line 70 and, as described hereinafter, represents the output of FOG 10.

As is well known in the art, the modulation signal in a FOG may be a stepped ramp or linear ramp serrodyne signal having a fixed amplitude of $2\pi$ radians and an essentially instantaneous flyback time. The operating modulator induces a phase difference between the counter-propagating waves because it acts on the waves at different times.

If the serrodyne frequency is an integer multiple of the loop eigenfrequency, $f_e$, the induced phase difference is zero. Flyback discontinuities in the serrodyne waveform make evaluation of the phase difference somewhat more complex for other frequencies. However, it is known that the effective phase difference, with regard to the behavior of the light intensity signal at the photodetector, is substantially proportional to small deviations of the serrodyne frequency from an integer multiple of the eigenfrequency, the eigenfrequency being given by:

$$f_e = 1/2\pi = c/2nL \qquad \text{(eq. 1)}$$

where: c is the speed of light in a vacuum; n is the index of refraction of the loop waveguide and L is the length of the loop. The total phase difference between counter-propagating waves comprises the sum of this modulation induced difference and the Sagnac phase shift.

The modulation control circuit is typically designed to recognize, as a reference, an electrical signal, on the line 68, which is characteristic of the reference light intensity signal produced at the photodetector 66 when the total phase difference is zero, e.g., the signal corresponding to a gyro at rest with serrodyne modulation at a multiple of the loop eigenfrequency. The modulation control circuit responds to deviations from this condition by altering a modulation signal parameter, e.g., the serrodyne frequency, to cancel the deviations and maintain the reference light intensity signal.

Thus, when the gyro is at rest, the serrodyne frequency is driven to a setpoint value, $f_0$, which equals a multiple of the loop eigenfrequency, $f_e$. If the gyro rotates at an arbitrary rate, R, the serrodyne frequency, in order to null the Sagnac phase shift and maintain the reference light intensity signal, changes to a first value, $f_1$, which differs from the setpoint frequency in proportion to the rate. The rotation rate is then given by:

$$R = K (f_1 - f_0) \qquad \text{(eq. 2)}$$

where K is a proportionality factor.

If the rate, R, remains constant and the modulation signal is switched to the other modulator, located at the opposite end of the loop, the effective polarity of the modulation-induced phase difference between waves is reversed and the serrodyne frequency, in order to again null the Sagnac phase shift, changes to a second value, $f_2$, such that:

$$-R = K (f_2 - f_0) \qquad \text{(eq. 3)}$$

Combining equations 2 and 3 yields:

$$f_1 - f_2 = 2R/K \qquad \text{(eq. 4)}$$

which shows that the frequency difference $(f_1 - f_2)$ is doubly sensitive to the FOG rotation rate, R, and is independent of the setpoint frequency, $f_0$. This is advantageous because $f_0$ may sometimes, for practical reasons, be set at a large non-zero value which may drift with variations of the sensor parameters appearing in Eq. 1.

An additional aspect of the present invention is that the setpoint frequency, $f_0$, can be easily determined by summing the modulator excitation frequencies, as given by:

$$f_1 + f_2 = 2f_0 \qquad \text{(eq. 5)}$$

If the FOG is initialized, as described above, such that the modulation frequency $f_0$ is equal, in the absence of rotation, to a multiple of the loop eigenfrequency, $f_e$, equation 5 may be used to determine the eigenfrequency, and thus the relevant sensing loop parameter combination given by equation 1, even when the FOG is subjected to rotation and even if the eigenfrequency drifts due to environmental influences or other disturbances.

Equation 1 illustrates the relationship between the eigenfrequency and the length, L, and index of refraction, n, of the loop. If the loop temperature is measured, permitting temperature-compensated determination of L, the resulting value of L, along with the eigenfrequency, as determined in equation 5, can be used in equation 1 to calculate n. If the temperature and wavelength dependencies of n are known, and if the latter dependence is sufficiently strong, it is possible to deduce the wavelength corresponding to the calculated value of n at the measured temperature. This wavelength can be used in determining the FOG scale factor.

The frequencies $f_1$ and $f_2$, which appear in Eqs. 4 and 5 are provided by the modulation control circuit at its output on the line 70. This output may, e.g., further provide these frequencies to known signal processing apparatus (not shown), which is synchronized with the switch 42, for evaluation of the rotation rate and setpoint frequency based on Eqs. 4 and 5.

Although the invention is illustrated as being implemented with two modulators 34,36 symmetrically offset with respect to the center of the loop 54, the invention would work equally as well with just the single modulator 36, as illustrated in FIG. 2. The use of the single modulator in this alternative embodiment eliminates the modulator 34, switch 42 and signal lines 38,40 from the embodiment of FIG. 1. Now, the output of the modulation control circuit 46 on the line 44 is input directly to the single modulator 36.

By using a single modulator, when the gyro is at rest, the serrodyne frequency is driven to a setpoint value, $f_0$, which equals an integral multiple of the loop eigenfrequency, $f_e$. If the gyro rotates at an arbitrary rate, R, the serrodyne frequency, in order to null the Sagnac phase shift and maintain the reference light intensity signal, changes to a first value, $f_{1'}$, which differs from the setpoint frequency in proportion to the rotation rate. The rate is then given by:

$$R = K (f_{1'} - f_0) \qquad \text{(eq. 6)}$$

where K is a proportionality factor.

If the rate, R, remains constant and the polarity of the modulation signal on the line 44 is switched (reversed), the polarity of the modulation-induced phase difference between waves is reversed and the serrodyne frequency, in order to again null the Sagnac phase shift, changes to a second value, $f_{2'}$, such that:

$$-R = K (f_{2'} - f_0) \qquad \text{(eq. 7)}$$

Combining equations 2 and 3 yields:

$$f_{1'} - f_{2'} = 2R/K \qquad \text{(eq. 8)}$$

$$f_{1'} + f_{2'} = 2f_0 \qquad \text{(eq. 9)}$$

Equation 8, which is similar to eq. 4, shows that the frequency difference $(f_1 - f_2)$ is doubly sensitive to the FOG rotation rate, R, and is independent of setpoint variations, as in eq. 4. Also, eq. 9, which is similar to eq. 5, may be used to determine the loop eigenfrequency when the setpoint is initialized as an integral multiple of this frequency.

Knowledge of this eigenfrequency is useful in a FOG which may, as is well known, employ additional dithered phase modulation at one end of the loop, yielding an easily measured detector signal component at the dither frequency, to enhance the FOG sensitivity to rotation. It is known, e.g., that setting the dither frequency equal to the loop eigenfrequency reduces FOG errors such as those resulting from optical backscatter and from spurious intensity modulations.

Although the invention is illustrated primarily as applied to a rotation sensor, it would work equally well in applications where optical phase differences between counter-propagating waves in the loop are induced by alternative perturbations, e.g., non-reciprocal measurands such as magnetic fields or time-varying phase disturbances, rather than rotation. Furthermore, although the controlled modulation signal parameter is illustrated as being the frequency of a serrodyne ramp signal, parameters of alternative known types of modulation, related in similar ways to the measurand of interest, may be used.

In addition, although the invention is illustrated as comprising in part an optical assembly which may provide optical splitting, filtering and combining operations, along with a separate modulator assembly, the invention would work equally as well when implemented with individual components to provide these functions, or with some or all of the components integrally combined in one or more IO devices, in a manner which should be apparent to one skilled in the art in light of the teachings herein.

It suffices for the present invention that, in accordance with a first aspect thereof, two matched phase modulators are oppositely, and preferably symmetrically, offset with respect to the center of an optical waveguide loop in a Sagnac interferometer sensor, the modulators are alternately excited by a waveform, specific parameters (e.g., frequency) of which are controlled by a detector feedback signal to alter the differential phase between counter-propagating waves which pass through the loop and the modulators, maintaining thereby a fixed intensity signal at a detector when the sensor is subjected to a non-reciprocal perturbation, such as rotation, the difference between the waveform parameters applied to the two modulators depending in a known, preferably linear, way on the magnitude and sense of the perturbation, the mean value of the controlled waveform parameters applied to the two modulators equalling the parameter value which would be assumed in the absence of the perturbation.

It also suffices that, in accordance with a second aspect of the present invention, a phase modulator is offset from the center of the loop, the modulator is alternately excited by a signal with specific waveform parameters (e.g., frequency), then by a signal of reverse polarity with changed values of these parameters, the values being controlled by a detector feedback signal to control the differential phase between the counter-propagating waves, maintaining thereby a fixed intensity signal at the detector when the sensor is subjected to a non-reciprocal perturbation, such as rotation, the difference between the controlled waveform parameters applied alternately to the modulator depending in a known, preferably linear, way on the magnitude and sense of the perturbation, the mean value of these waveform parameters equalling the parameter value which would be assumed in the absence of rotation.

Although the invention has been described and illustrated with respect to certain exemplary embodiments thereof, it should be understood by those skilled in the art that various changes, omissions and additions may be made without departing from the spirit and the scope of the invention.

We claim:

1. An optical interferometer, comprising:
an optical waveguide loop;
means for providing a pair of light waves counter-propagating in said loop;
means for combining said light waves after counter-propagating in said loop, and for providing an optical output signal indicative thereof, said combined light waves having a phase difference therebetween, a component of said phase difference being dependent on the magnitude and sense of a perturbation applied to said loop;
detection means, for detecting said optical output signal, and for providing a detection signal, a component of said detection signal being dependent on any phase difference between said combined light waves;
signal generator means, responsive to said detection signal, for generating a drive signal; and
modulator means, responsive to said drive signal, for phase modulating said counter-propagating light waves, said modulator means comprising a pair of modulators oppositely offset with respect to a center of said loop, said modulators being alternately excited in response to said drive signal, a parameter of said drive signal being of a value so as to null any phase difference between said counter-propagating waves resulting from application of said perturbation, thereby maintaining said component of said detection signal at a value equal to a value of said component in the absence of said perturbation, a difference between said parameter of said drive signal applied to said first modulator and said parameter of said drive signal applied to said second modulator being dependent in a known way on the magnitude and sense of said perturbation, which can therefore be inferred from said difference, a mean value of said parameter of said drive signal applied to said modulators approximately equalling a setpoint parameter value which prevails in the absence of said perturbation.

2. The interferometer of claim 1, wherein said optical waveguide loop comprises an optical fiber.

3. The interferometer of claim 1, further comprising switch means, for alternately switching said drive signal between said pair of modulators.

4. The interferometer of claim 1, further comprising integrated optical device, said modulator means being fabricated on said integrated optical device.

5. The interferometer of claim 1, wherein said drive signal comprises a linear ramp signal having a fixed amplitude of $2\pi$ radians, said parameter of said drive signal comprising the frequency of said linear ramp signal.

6. The interferometer of claim 1, wherein said drive signal comprises a stepped ramp signal having a fixed amplitude of $2\pi$ radians, said parameter of said drive signal comprising the frequency of said stepped ramp signal.

7. The interferometer of claim 1, wherein said perturbation comprises a rotation of said loop about an axis perpendicular to said loop.

8. A fiber optic gyroscope, comprising:
an optical fiber loop;
light source means, for providing a coherent light wave;
beamsplitter means, for splitting said coherent light wave into a pair of light waves counter-propagating in said loop, said beamsplitter means combining said light waves after counter-propagating in said loop into an optical output signal, said combined light waves having a phase difference therebetween, a component of said phase difference being proportional to any rotation of said loop, the intensity of said optical output signal being dependent on any phase difference between said combined light waves;
detection means, for detecting said optical output signal, and for providing a detection signal proportional to the intensity of said optical output signal, a component of said detection signal being dependent on said rotation rate;
signal generator means, responsive to said detection signal, for generating a drive signal; and
modulator means, responsive to said drive signal, for phase modulating said counter-propagating light waves, said modulator means comprising a pair of modulators oppositely offset with respect to a center of said loop, said modulators being alternately excited at first and second frequencies in response to said drive signal, said first and second frequencies each being of a value so as to null any phase difference between said counter-propagating waves resulting from rotation of said loop, thereby maintaining said component of said detection signal at a value equal to a value of said component of said detection signal in the absence of loop rotation, a difference between the value of a parameter of said drive signal applied to a first one of said modulators and the value of said parameter of said drive signal applied to a second one of said modulators being dependent in a known way on a rate of rotation of said loop, a mean value of said parameter of said drive signal equalling a setpoint value of said parameter in the absence of loop rotation.

9. The gyroscope of claim 8, further comprising switch means, for alternately switching said drive signal between said pair of modulators.

10. The gyroscope of claim 8, further comprising an integrated optical device, said beamsplitter means and said modulator means being fabricated on said integrated optical device.

11. The gyroscope of claim 8, wherein said drive signal comprises a linear ramp signal having a fixed amplitude of $2\pi$ radians, said parameter of said drive signal comprising the frequency of said linear ramp signal.

12. The gyroscope of claim 8, wherein said drive signal comprises a stepped ramp signal having a fixed amplitude of $2\pi$ radians, said parameter of said drive signal comprising the frequency of said stepped ramp signal.

13. An optical interferometer, comprising:
an optical waveguide loop;
means for providing a pair of light waves counter-propagating in said loop;
means for combining said light waves after counter-propagating in said loop, and for providing an optical output signal indicative thereof, said combined light waves having a phase difference therebetween, a component of said phase difference being dependent on the magnitude and sense of a perturbation applied to said loop;
detection means, for detecting said optical output signal, and for providing a detection signal, a component of said detection signal being dependent on any phase difference between said combined light waves;
signal generator means, responsive to said detection signal, for generating a drive signal; and
modulator means, responsive to said drive signal, for phase modulating said counter-propagating light waves, said modulator means being offset from a center of said loop, said signal generator means reversing the polarity of said drive signal at intervals of time, a parameter of said drive signal being of a value so as to null any phase difference between said counter-propagating waves resulting from application of said perturbation to said loop, thereby maintaining said component of said detection signal at a value equal to a value of said component in the absence of said perturbation, a difference between said parameter of said drive signal at successive intervals of time being dependent in a known way on said perturbation, which can therefore be inferred from said difference, a mean value of said parameter of said drive signal at successive intervals of time approximately equalling a setpoint parameter value which prevails in the absence of said perturbation; and
wherein said drive signal comprises a linear ramp signal having a fixed amplitude of $2\pi$ radians, said parameter of said drive signal comprising the frequency of said linear ramp signal.

14. An optical interferometer, comprising:
an optical waveguide loop;
means for providing a pair of light waves counter-propagating in said loop;
means for combining said light waves after counter-propagating in said loop, and for providing an optical output signal indicative thereof, said combined light waves having a phase difference therebetween, a component of said phase difference being dependent on the magnitude and sense of a perturbation applied to said loop;
detection means, for detecting said optical output signal, and for providing a detection signal, a component of said detection signal being dependent on any phase difference between said combined light waves;
signal generator means, responsive to said detection signal, for generating a drive signal; and
modulator means, responsive to said drive signal, for phase modulating said counter-propagating light waves, said modulator means being offset from a center of said loop, said signal generator means reversing the polarity of said drive signal at intervals of time, a parameter of said drive signal being of a value so as to null any phase difference between said counter-propagating waves resulting from application of said perturbation to said loop, thereby maintaining said component of said detection signal at a value equal to a value of said component in the absence of said perturbation, a difference between said parameter of said drive signal at successive intervals of time being dependent in a known way on said perturbation, which can therefore be inferred from said difference, a mean value of said parameter of said drive signal at successive intervals of time approximately equalling a setpoint parameter value which prevails in the absence of said perturbation; and wherein said drive signal comprises a stepped ramp signal having a fixed amplitude of $2\pi$ radians, said parameter of said drive signal comprising the frequency of said stepped ramp signal.

15. A fiber optic gyroscope, comprising:

an optical fiber loop;

light source means, for providing a coherent light wave;

beamsplitter means, for splitting said coherent light wave into a pair of light waves counter-propagating in said loop, said beamsplitter means combining said light waves after counter-propagating in said loop into an optical output signal, said combined light waves having a phase difference therebetween, a component of said phase difference being proportional to any rotation of said loop, the intensity of said optical output signal being dependent on any phase difference between said combined light waves;

detection means, for detecting said optical output signal, and for providing a detection signal proportional to the intensity of said optical output signal, a component of said detection signal being dependent on said rotation rate;

signal generator means, responsive to said detection signal, for generating a drive signal; and modulator means, responsive to said drive signal, for phase modulating said counter-propagating light waves, said modulator means being offset from a center of said loop, said signal generator means reversing the polarity of said drive signal at intervals of time, a parameter of said drive signal being of a value so as to null any phase difference between said counter-propagating waves resulting from rotation of said loop, thereby maintaining said component of said detection signal at a value equal to a value of said component of said detection signal in the absence of loop rotation, a difference between the values of a parameter of said drive signal at successive intervals of time being dependent in a known way on a rate of rotation of said loop, a mean value of said parameter of said drive signal at successive intervals of time equalling a setpoint value of said parameter in the absence of loop rotation; and wherein said drive signal comprises a linear ramp signal having a fixed amplitude of $2\pi$ radians, said parameter of said drive signal comprising the frequency of said linear ramp signal.

16. A fiber optic gyroscope, comprising:

an optical fiber loop;

light source means, for providing a coherent light wave;

beamsplitter means, for splitting said coherent light wave into a pair of light waves counter-propagating in said loop, said beamsplitter means combining said light waves after counter-propagating in said loop into an optical output signal, said combined light waves having a phase difference therebetween, a component of said phase difference being proportional to any rotation of said loop, the intensity of said optical output signal being dependent on any phase difference between said combined light waves;

detection means, for detecting said optical output signal, and for providing a detection signal proportional to the intensity of said optical output signal, a component of said detection signal being dependent on said rotation rate;

signal generator means, responsive to said detection signal, for generating a drive signal; and modulator means, responsive to said drive signal, for phase modulating said counter-propagating light waves, said modulator means being offset from a center of said loop, said signal generator means reversing the polarity of said drive signal at intervals of time, a parameter of said drive signal being of a value to as to null any phase difference between said counter-propagating waves resulting from rotation of said loop, thereby maintaining said component of said detection signal at a value equal to a value of said component of said detection signal in the absence of loop rotation, a difference between the values of a parameter of said drive signal at successive intervals of time being dependent in a known way on a rate of rotation of said loop, a mean value of said parameter of said drive signal at successive intervals of time equalling a setpoint value of said parameter in the absence of loop rotation; and wherein said drive signal comprises a stepped ramp signal having a fixed amplitude of $2\pi$ radians, said parameter of said drive signal comprising the frequency of said stepped ramp signal.

* * * * *

UNITED STATES PATENT AND TRADEMARK OFFICE
CERTIFICATE OF CORRECTION

PATENT NO. : 5,137,357

DATED : August 11, 1992

INVENTOR(S) : Carl M. Ferrar et al.

It is certified that error appears in the above-identified patent and that said Letters Patent is hereby corrected as shown below:

Column 12, line 36, after value delete "to" and insert --so--

Signed and Sealed this

Seventh Day of September, 1993

Attest:

*Attesting Officer*

BRUCE LEHMAN

*Commissioner of Patents and Trademarks*